Patented Feb. 28, 1933

1,899,665

UNITED STATES PATENT OFFICE

RICHARD SAMUEL BROOKMAN, OF LOUGHBOROUGH, ENGLAND

WOODWORKING MACHINE

Application filed November 10, 1930, Serial No. 494,799, and in Great Britain November 12, 1929.

This invention comprises improvements in woodworking machines and has particular reference to dovetailing machines of the type embodying a work table or holder adapted for movement in a horizontal plane relatively to a series of vertical cutters in both a longitudinal and transverse direction.

An important object of this invention is to provide simple and efficacious means for enabling a machine as above to cut dovetails of different sizes.

According to the present invention a dovetailing machine of the above type is provided wherein variable traverse is imparted to the work table in its longitudinal and transverse directions by a rotary cam device.

This cam device is advantageously mounted upon the machine in a readily removable and interchangeable manner, and the arrangement is such that by removing the cam and replacing same by another of different design the dimensions of the dovetailing produced by the machine is varied.

Means are also incorporated for enabling the operation of the machine to be effected either automatically or manually at will.

For the purpose of more fully describing the nature of this invention reference will now be made to the accompanying drawings, wherein:—

Figure 1:
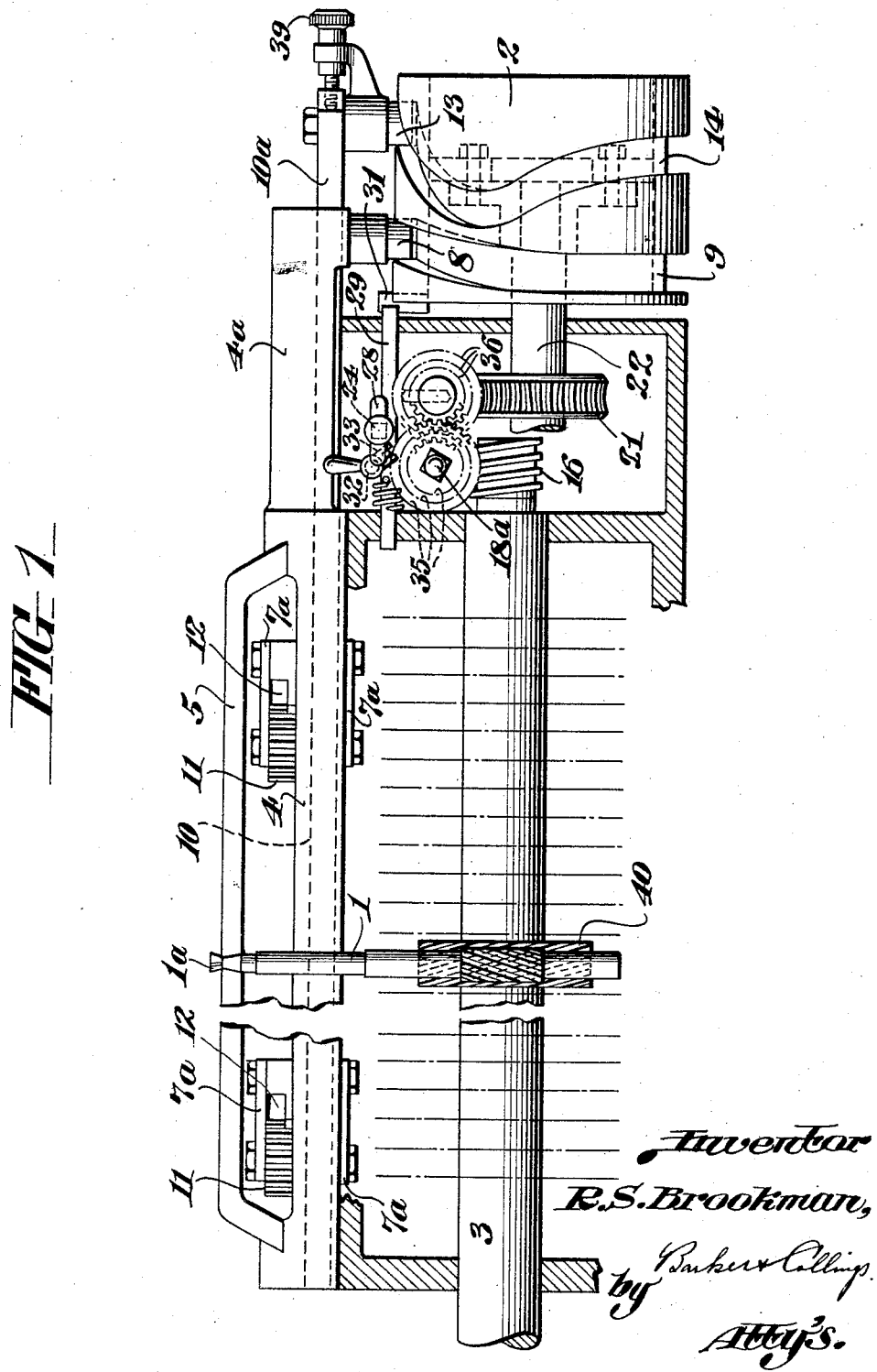
Figure 1 illustrates in part sectional front elevation the main part of a machine constructed in accordance with this invention.
Figure 2:
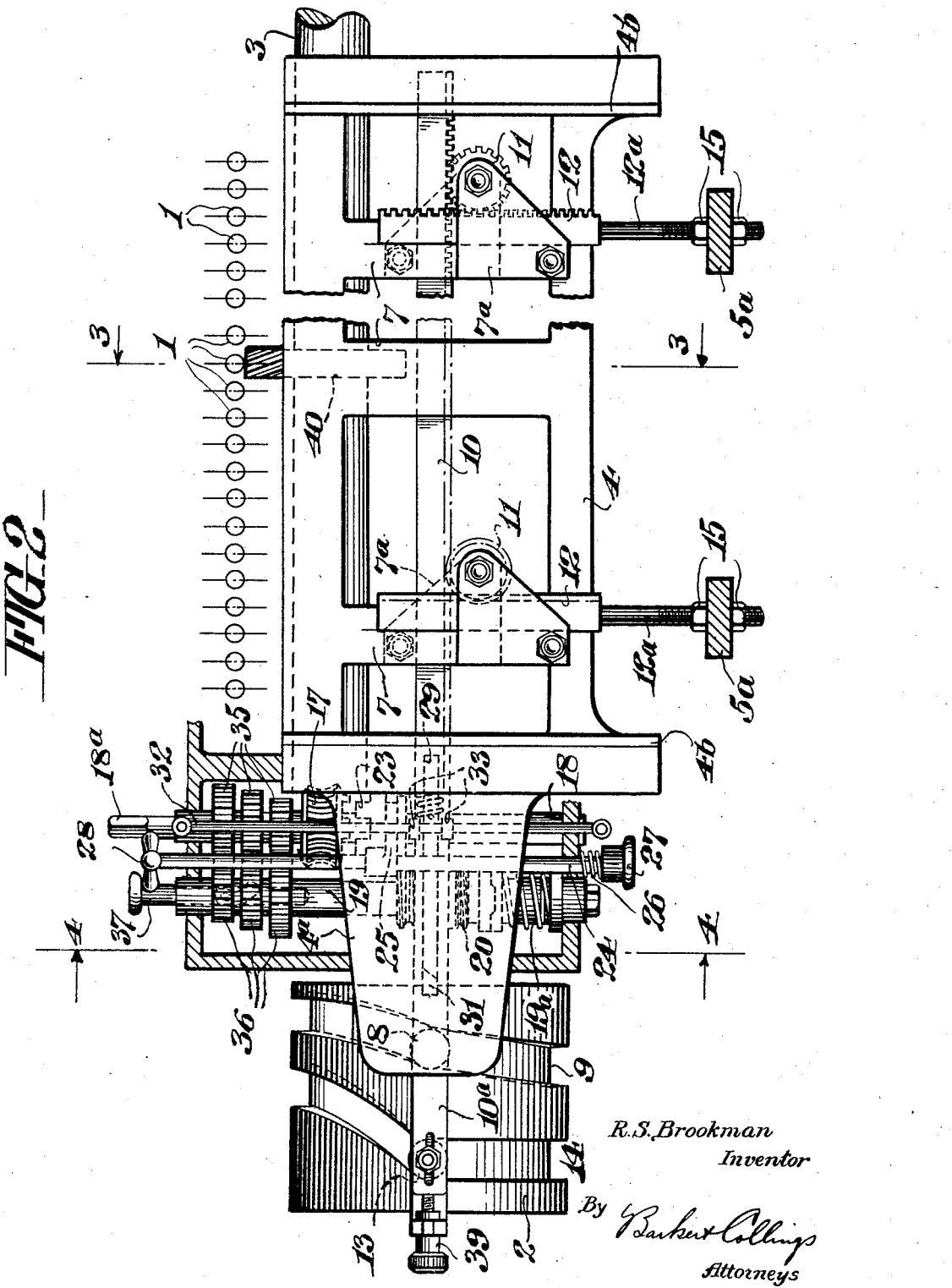
Figure 2 is a plan view of Figure 1 the parts being in section.
Figure 3:
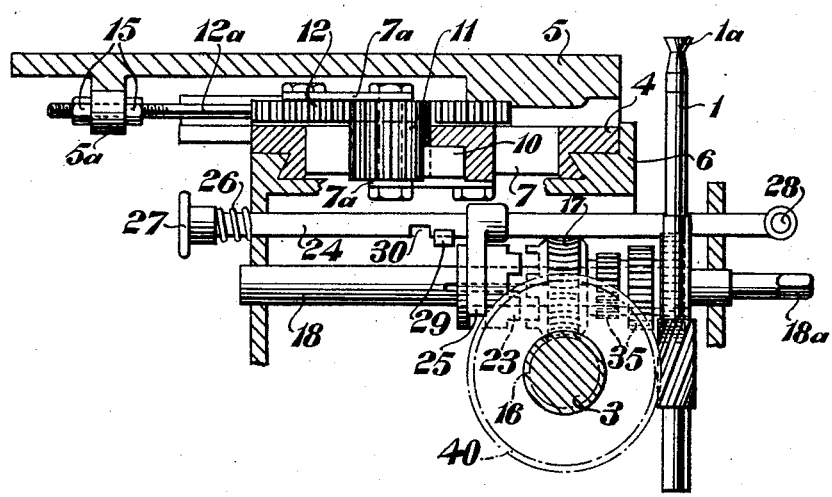
Figure 3 is a cross sectional elevation through the machine taken on the line III—III of Figure 2.
Figure 4:
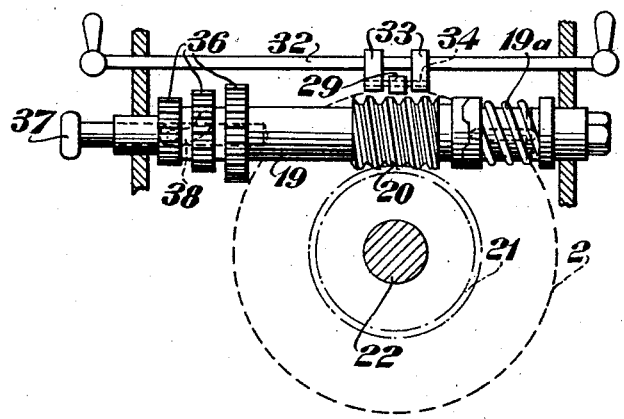
Figure 4 is a cross sectional detail view illustrating transmitting drive to the control cam taken on the line IV—IV of Figure 2.

In one method of carrying out the invention the machine is provided with a series of vertically disposed rotary cutters 1 in front of the work table or holder. At one side of the machine is mounted a suitable drum 2 which is adapted to rotate on a horizontal axis, said drum being driven through suitable reduction gearing from the main shaft 3 which extends horizontally across the machine at the rear of the cutter spindles 1 and transmits motion to said spindles. Drive may be imparted to the main shaft 3 either directly or indirectly from an electric motor or any other convenient power source.

The work table is composed of two relatively movable parts, one part 4 being adapted for movement longitudinally of the machine and another part 5 for transverse motion, i. e. front to rear and vice versa.

The longitudinally movable table 4 is slidable within a stationary dovetailed guide or support 6 while the transversely movable table 5 is slidably guided within dovetailed guides 4b formed in the said longitudinally displaceable table 4.

To effect the motion of the longitudinally slidable table 4, said table is provided with an arm or extension 4a which projects over the aforesaid rotatable drum 2 and carries a depending truck or roller 8 adapted to coact with a cam groove or track 9 provided circumferentially in said drum.

The requisite motion is transmitted to the transversely slidable table 5 through the medium of a longitudinally slidable rack bar 10 meshing with toothed wheels 11 mounted on non-rotatable vertical axes, said wheels 11 in turn meshing with rack bars 12 which are suitably secured to the table 5. The longitudinal rack bar 10 has an extension 10a projecting out at the side of the machine over the drum 2, and from said extension 10a depends a truck or roller 13 which coacts with and is adapted to traverse a second cam groove or track 14 provided circumferentially in the drum 2.

The wood to be dovetailed is secured upon the table 5 which may therefore be termed the work table proper.

The arrangement is such that by suitably shaping the cam grooves 9 and 14 the requisite combined motions are imparted to the work table 5 so as to move the edge of the work relatively to the cutters 1a carried by the cutter spindles 1 and produce the required dovetailing.

The toothed wheels 11 which are rotated by the longitudinal rack bar 10 and mesh with the transverse rack bars 12 may be mounted between fixed plate members 7a suitably secured to transverse pieces 7 which may be integral with table 4, and if desired said table 5 may be connected at or near its rear part to screw threaded rods 12a extending rearwardly from the traversable rack bars 12. This connection may be effected by passing the screw threaded rods 12a through lugs 5a on the underside of the table 5, fixing nuts 15 enabling the disposition of said table 5 to be adjusted.

The drive from the driving shaft 3 is transmitted through a worm 16 on said shaft to a worm wheel 17 mounted upon a cross shaft 18, motion being transmitted from said shaft 18 through a suitable train of gears to a second cross shaft 19 located alongside said shaft 18, said second cross shaft 19 driving through a safety clutch device 19a a worm 20 freely mounted on the shaft 19 and meshing with a worm wheel 21 fixed to rotate with the shaft 22 of the cam 2.

The worm wheel 17 on the cross shaft 18 is free to rotate relatively to said shaft until clutched thereto by a sliding dog clutch or its equivalent 23 which is moved into and out of engagement with the worm wheel 17 by the longitudinal displacement of a sliding rod 24 carrying a clutch-moving arm 25.

When, therefore, it is desired to transmit motion to the work-carrying tables, the clutch-operating rod 24 is displaced against the resistance of a spring 26 either by pressing the knob 27 or pulling the terminal 28, and in so doing the clutch 23 is caused to mesh with the worm 17 so as to transmit the drive through intermeshing gears to the second cross spindle 19 and thence through worm 20 and worm wheel 21 to the cam drum. When the clutch-operating rod 24 is displaced to bring the clutch into engagement same is automatically retained in the displaced position by a small spring-pressed rod 29 which automatically coacts with a recess 30 in said rod 24. The rod 29 is provided with a notch or recess upon its upper surface and the drive of the cam is continued until the said rod 29 is displaced out of engagement with the said recess 30 and to position the said notch upon its upper surface so that the lower parts of the clutch operating rod 24 may move transversely in the said notch and return the clutch 23 to its inoperative position under the influence of the spring 26.

The disengagement of the locking rod 29 from the clutch-operating rod 24 may be effected automatically by means of a bevel-faced abutment 31 mounted at and projecting from the periphery of the cam drum 2, said abutment being adapted to coact with a similarly bevelled extremity of the locking rod 29 so as to move same out of locking engagement with the clutch rod 24. Additionally the disengagement of the small locking rod 29 from the clutch rod 24 may be effected manually by the rotation of a suitably mounted cross spindle 32 having one or more slotted crank arms 33 coacting with a pin or pins 34 projecting from the said locking rod 29.

In order to enable the speed of motion of the work tables and consequently also the rate of work feed to be varied, change speed gearing is advantageously incorporated between the main drive shaft and the cam drum. In one arrangement a three speed gear is provided embodying three different sized gear wheels 35 mounted on the cross shaft 18 meshing with three other gears 36 on the second cross shaft 19. The gears 36 are adapted to be separately keyed to the shaft 19 to rotate therewith by any suitable means such as by the slidable displacement of a gear change rod 37 carrying a pivoted spring-influenced key 38 which is shaped to coact with an internal keyway provided in each of the gear wheels; the arrangement being such that the drive is transmitted through that gear wheel 36 which is keyed to the shaft 19.

If desired motion may be transmitted to the work tables manually, and to this end the cross shaft 18 may have a square extension 18a for the reception of a handle or crank by means of which said shaft may be turned.

The accurate adjustment of the work tables prior to commencing the cutting operation may be effected by manipulation of a turnscrew 39.

It will be appreciated that by removing the cam drum 2 and replacing same with a drum having differently cut or designed cam grooves or tracks the dimensions or pitch of the dovetailing accomplished by the machine is altered; therefore, one and the same machine can be employed for cutting different sizes of dovetails.

Although the invention has been described for cutting dovetails horizontally into the edge of the work, it is to be understood that the machine is equally applicable for cutting dovetails into work which is supported vertically or at any other suitable angle.

Direct drive from the main drive shaft 3 is transmitted to each cutter spindle 1 by intermeshing spiral gearing 40, it being understood that such spiral gearing is provided in connection with each cutter spindle. Additionally the several spindles with intermeshing worm gearing and change speed gears are all advantageously completely enclosed and adapted to run in oil.

I claim:—

1. A dovetailing machine comprising a work table, a series of vertical cutters, a removable and interchangeable rotary cam device having two cam tracks, longitudinal motion being imparted to the work table directly from one cam track and transverse motion being imparted to said work table from the second track indirectly through intermeshing racks and toothed wheels.

2. A dovetailing machine comprising a work table, a series of vertical cutters, a rotary cam device, two cam tracks on said cam device, means coacting with one cam track functioning to impart longitudinal motion to the work table, means coacting with the other cam track functioning to impart transverse motion to said table, variable speed gearing through which drive is transmitted to the cam device, a clutch device functioning to render operative or inoperative at will said cam device and the work table traversing means associated therewith and means whereby the clutch is automatically displaced at predetermined intervals to discontinue the motion of the work table.

3. A dovetailing machine comprising a main drive shaft, a series of vertical cutters, means associated with said drive shaft for simultaneously imparting rotation to said cutters, a cam shaft, a rotary cam device carried by said cam shaft, two cam tracks on said cam device, a work table or holder, means coacting with one of said cam tracks operating to impart longitudinal motion to said work table, means coacting with the other of said cam tracks functioning through the intermediary of rack and pinion mechanism to impart transverse motion to said work table, variable speed gearing interposed between the main drive shaft and the cam shaft through which gearing rotary motion is imparted to the cam device, a gear locking element associated with said variable speed gearing, means for displacing said gear locking element axially of certain of the toothed gears appertaining to the variable speed gearing so as to bring any one of a plurality of speeds into operation, and a clutch device operable to discontinue at will the drive from the main drive shaft to the cam shaft.

4. A dovetailing machine as claimed in claim 3 and including an element carried by the rotary cam device adapted to coact with a clutch-retaining element so as to displace said element and allow the clutch to move to a disengaged position under spring influence.

5. In a dovetailing machine the combination of a work table, a series of vertical stationary cutters, said table being movable both longitudinally and transversely relatively to said cutters, and a removable and interchangeable cam device carrying two cam tracks, one of said tracks producing longitudinal motion of the work table and the other transverse motion of said table.

RICHARD SAMUEL BROOKMAN.